(No Model.)  T. WARD.  2 Sheets—Sheet 1.
PLOW.
No. 323,836.   Patented Aug. 4, 1885.
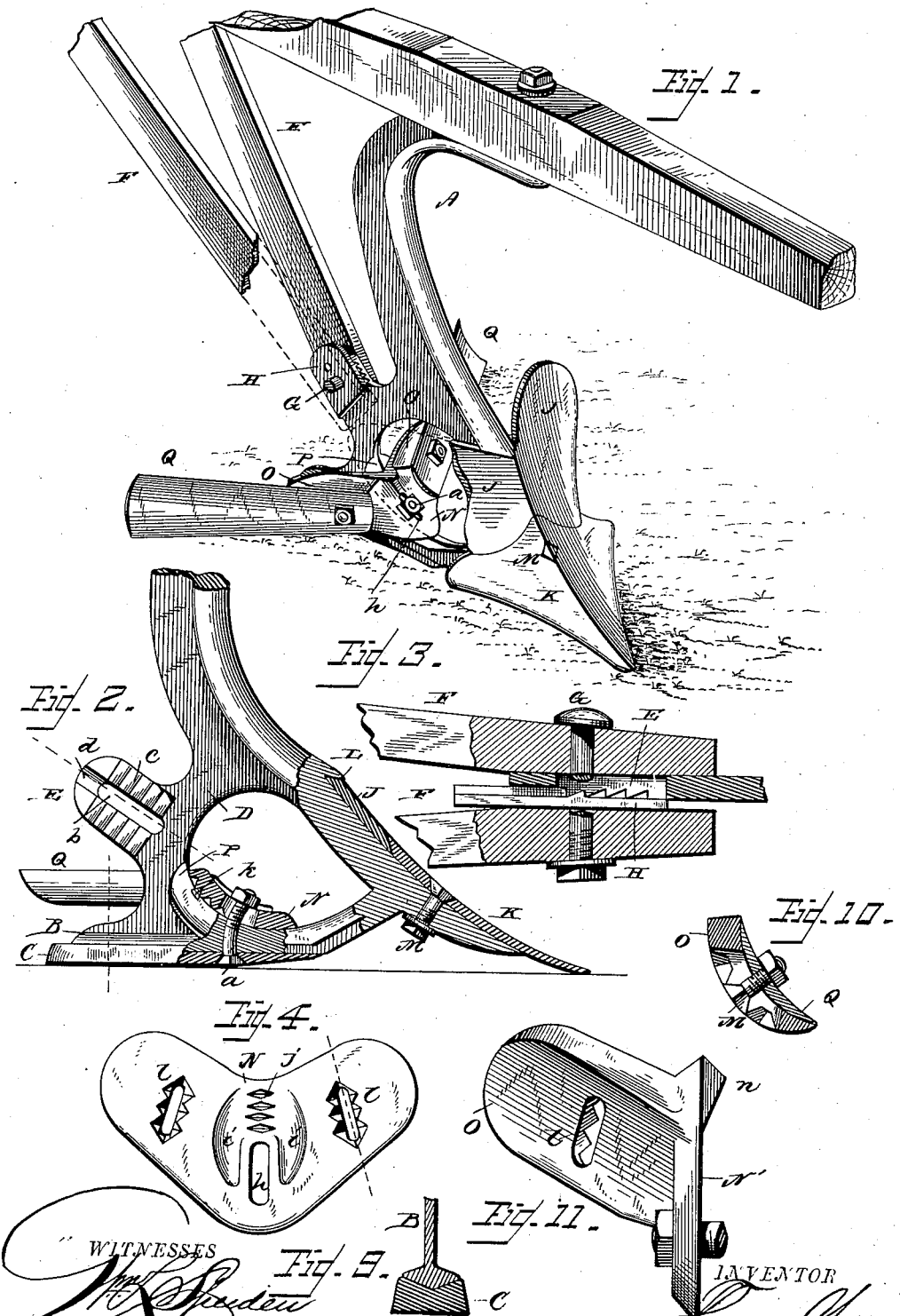
WITNESSES 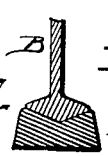
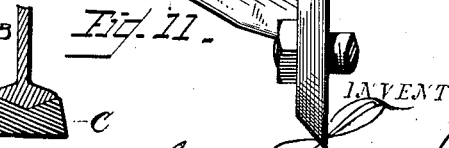
INVENTOR
Attorney

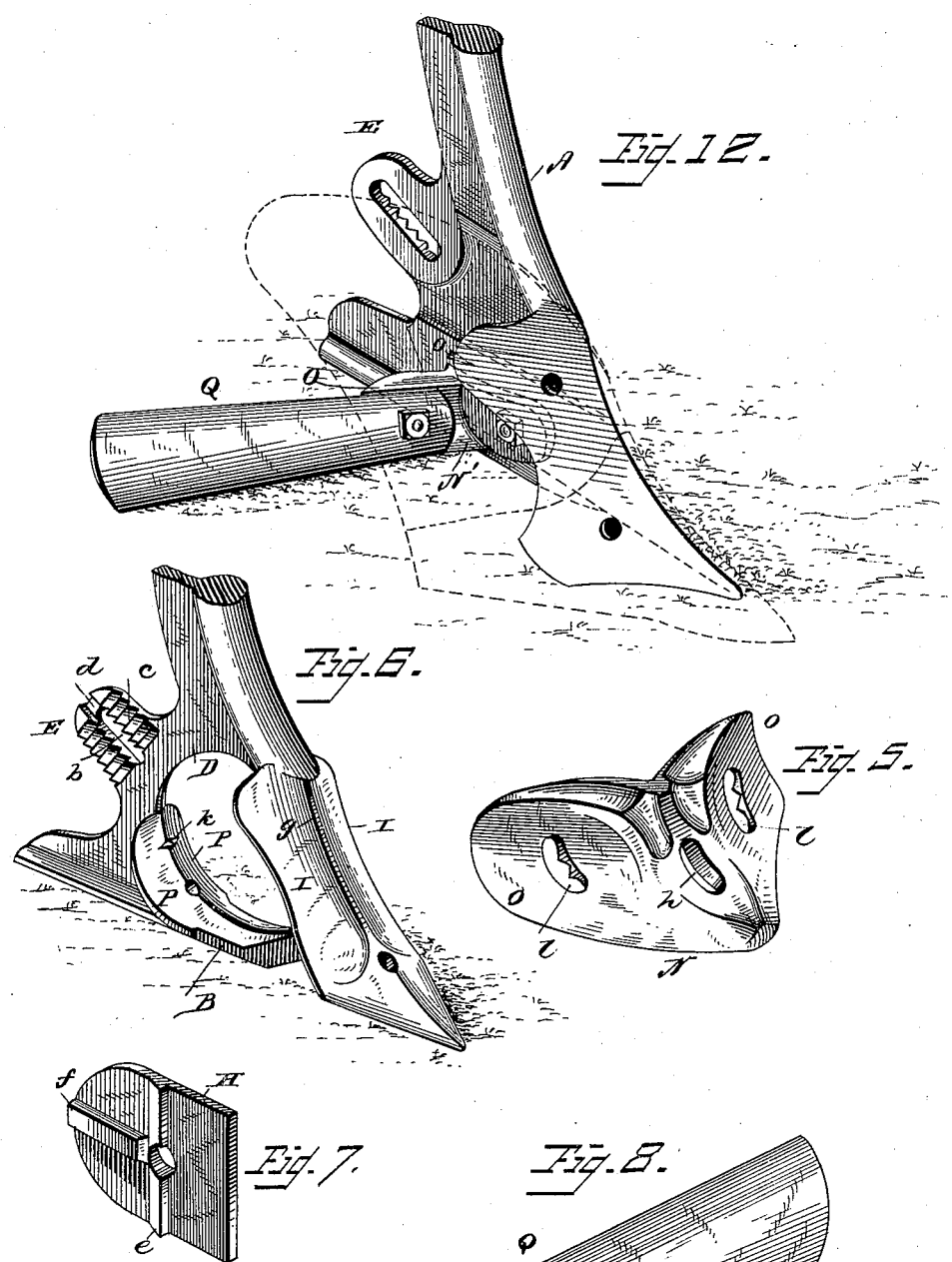

UNITED STATES PATENT OFFICE.

THOMAS WARD, OF HARPER'S, NORTH CAROLINA.

PLOW.

SPECIFICATION forming part of Letters Patent No. 323,836, dated August 4, 1885.

Application filed November 17, 1884. (No model.)

*To all whom it may concern:*

Be it known that I, THOMAS WARD, a citizen of the United States, residing at Harper's, in the county of Johnston and State of North Carolina, have invented certain new and useful Improvements in Plows; and I do hereby declare the following to be a full, clear, and exact description of the invention, such as will enable others skilled in the art to which it appertains to make and use the same, reference being had to the accompanying drawings, forming part of the same, in which—

Figure 1 is a perspective of the plow with parts broken away. Fig. 2 is a side elevation thereof, partly in section. Fig. 3 is a horizontal section through the parts where the handles are attached. Fig. 4 is a bottom view of the sweep-holder; Fig. 5, a top view in perspective thereof; Fig. 6, a perspective of the standard, with mold-board and other parts removed; Fig. 7, a perspective of the handle-adjusting plates; Fig. 8, a perspective of a sweep; Fig. 9, a cross-section through sole and standard-bar; Fig. 10, a cross-section through a sweep and one wing or ear of the sweep-holder; Fig. 11, a perspective or modified form of sweep-holder; Fig. 12, a perspective of an ordinary turning-plow, with such form of holder and sweep attached.

In the drawings, the letter A designates a standard provided with a bar, B, for the attachment of the removable sole C, the said bar being beveled on its under side from the middle toward its sides, so as to form a V-shaped face which will fit into a correspondingly-shaped cavity in the top of the sole, so as to prevent the sole from slipping sidewise on the bar and to render one bolt, $a$, sufficient for securely holding said parts together.

A bar, D, extends from the standard proper down to the bar B, and has an ear, E, extending backwardly therefrom, said ear being formed with an elongated slot, $b$, and one side formed with teeth or serrations $c$, running transversely of the ear, and also with a groove, $d$, extending on the same side from the upper end of the slot to the end of the ear, although it might terminate between such points. This ear is for the attachment of the handles F, which may be adjusted by means of the bolt G, passed through the same and the slot in the ear. In order to prevent the handles from slipping, a plate or washer, H, is formed with a bolt-hole through it, and formed on one face with a tooth, $e$, to engage with the serrations $c$, to hold it in its adjustment, and with a lug, $f$, to fit into the groove $d$ to prevent the said plate from turning. If it were not for said plate the handles F might slip; but the construction described permits the necessary adjustment and yet securely holds the handles.

The lower front part of the standard is formed with side flanges, I, to form a broad bearing for the shovel mold-board J, the said mold-board resting at its middle upon the ridge $g$ and farther toward its edges upon said flanges. The point K rests upon the lower end or extension of said standard.

The mold-board is held securely in place by a lip, L, on the standard, and by the upper edge of the point K, the meeting edges of the mold-board and point being beveled, so that the latter will lap over the former. The upper edge of the board fits under the lip L, and, as stated, the upper edge of the point fits over its lower edge, so that by such means and the double side inclination of the board the latter is held securely in place without the aid of any bolt passing through the same.

The point is held in place by a single bolt, M, passed through it and the lower extension of the standard. It will thus be seen that a single bolt holds both the mold-board and point in place, so that said parts are quickly and easily put on and taken off the standard, even by the most inexperienced person, and the construction greatly simplified and durability of the parts increased.

To the lower part of the arm D, adjacent to the sole-bar B, there is secured an adjustable sweep-holder, N, for the attachment of the sweeps, the sweep-holder being secured to its seat by the same bolt $a$ that holds the sole to its bar, said bolt passing through an elongated slot, $h$, in the sweep-holder. This sweep-holder is formed with wings or ears O, extending rearwardly and somewhat upwardly from opposite sides of its central or middle portion, said wings being made concave on their faces between their upper and lower edges, the concavity extending outwardly toward the outer ends of said wings, as illustrated. Each of these wings is formed with a vertically-arranged slot, $l$, as shown, for the adjustment of the sweeps, as hereinafter described; but any other slot that will permit the same adjustment of the sweeps will be comprised within my invention.

In order to afford a broad bearing or back for the sweep-holder, flanges P are formed on opposite sides of the bar D, and preferably extend from the sole-bar B upwardly. These flanges brace the sweep-holder and aid in firmly holding it to its proper position for the most effective work. It is not necessary that the whole under surface of the sweep-holder rest upon said flanges, and, therefore, in order to reduce the weight of the sweep-holder and to save metal the under side of the sweep-holder may be hollowed out around its central elongated slot, as shown at $i$, so that the sweep-holder will then rest on its seat at a point along the outer edges of the slot and again on the other side of the hollowed-out portion.

The central elongated slot will permit the sweep-holder to be moved up and down, and the sweep-holder will be held at any adjustment by means of the bolt $a$; but in order to guard against slipping, resulting from careless tightening of the bolt, serrations $j$ may be formed on the sweep-holder, and a pin, $k$, on the ridge between the flanges P to engage with said serrations. Said pin and serrations, however, are not at all essential, but may be employed as long-known and commonly-practiced means for preventing one part from slipping on another. So, also, in order to guard against the sweeps slipping from their adjustment, the slots $l$ may be serrated along their sides on the under side of the sweep-holder, and the bolts $m$, which secure the sweeps to the wings, formed with shoulders or square corners beneath their heads, so as to fit in said serrations, and thus prevent the bolts from slipping.

The sweeps Q are formed with concave faces and convex backs, the back being also convex at the end which fits into the concave face of the wing of the sweep-holder. By making the back of the sweep convex, as described, the sweep can be adjusted in the arc of a circle from end to end, so as to regulate the throw of earth toward the plants. By moving the sweep up on the sweep-holder the top edge of it is thrown forward, so as to throw more soil against the plants, and by moving it down the sweep presents less of an angle to the surface, so that less earth is thrown sidewise to the plants. The concave in the face of the wing and convex back to the sweep allow the sweep to be adjusted bodily from end to end in the arc of a circle, so that the amount of soil to be thrown to the plant can be regulated, and practically the same depth of cut preserved without throwing the sweeps as far back or their outer ends as high up as where the sweeps are pivoted at their inner ends, and consequently avoiding the objections to the latter way of securing the sweeps.

When it is desired to plow deep, the sweep-holder is raised, so as to lift the sweeps and thus permit the point to cut deeper without altering the set of the sweeps on the sweep-holder. When it is desired to have the sweep to cut deeper, the sweep-holder is dropped.

The main feature of this part of my invention is in having the sweeps adjustable bodily in the arc of a circle from end to end, so as to control the throw of the soil up to the plants without altering the oblique angle at which the sweeps stand to the side of the plow to such an extent as to seriously impair the working of the sweeps.

When such a sweep is to be used on an ordinary turn-plow, the sweep-holder is made single and formed with a plate, N', through which the bolt passes to secure it to the inside of the landside-bar or to a portion of the standard that fits against it, as illustrated in Fig. 12, the said plate also being formed with a spur, $n$, which will fit into any one of several serrations $o$, formed in the lower inside of the standard, as shown, so as to aid in holding the sweep-holder to the position to which it may be adjusted.

The form of the wing O and the sweep Q and the adjustment and operation of the parts, however, are substantially the same as when the other form of sweep-holder is used.

Having thus described my invention and set forth its merits, what I claim as new is—

1. The plow-standard A, formed with downwardly-projecting lip L, beveled on its under face, and the flanges I, inclining backwardly on opposite sides of the standard, and a double inclined extension below said flanges formed with a hole to receive a bolt to secure a point to said extension, substantially as described.

2. The combination, in a shovel-plow, with a standard, A, formed with a downwardly-projecting lip, L, beveled on its under face, and the flanges I, inclining backwardly on opposite sides of the standard, and a double inclined extension below said flanges formed with a hole to receive a bolt, of a double-inclined mold-board, J, formed with beveled upper and lower edges and bearing on the two flanges I, and the double-inclined point K, secured to said extension by a bolt, M, and having a beveled upper edge overlapping the lower beveled edge of the mold-board, substantially as described.

3. The double-inclined plow-point formed to fit upon a double-inclined standard, and with an upper beveled edge to fit over the lower beveled edge of a double-inclined mold-board and with a bolt-hole, substantially as described.

4. The combination, with the sweep-holder having a wing formed with a concave face, of a sweep having a convex back fitting in said concave face, whereby the sweep may be adjusted bodily from end to end in the arc of a circle, as set forth, substantially as and for the purposes described.

5. The combination of the standard, an arm extending below the same, a sweep-holder adjustable on said arm and provided with side wings having concave faces, and sweeps having convex backs fitting in said concave faces and adjustable on said wings, whereby said sweep-holder and sweeps may each be adjusted, as set forth, substantially as and for the purposes described.

6. The combination of the standard, the arm extending below the same and provided with the side flanges, the adjustable sweep-holder resting on said flanges and provided with wings, and sweeps secured to said wings, substantially as and for the purposes described.

7. The combination of the sweep, sweep-holder, a support for the same, the sole-bar, the removable sole, and the bolt passed through the sole, bar, and sweep-holder to secure said parts, substantially as and for the purposes described.

8. The combination of the standard, the bar extending below the same, the ear projecting from said bar and formed with an elongated slot, and on one side with transverse serrations and a groove, and the perforated plate formed with a tooth to engage with said serrations, and a lug to fit in said groove, substantially as and for the purposes described.

In testimony whereof I affix my signature in presence of two witnesses.

THOMAS WARD.

Witnesses:
FRANKLIN H. HOUGH,
M. P. CALLAN.